United States Patent
Fujikake et al.

[11] Patent Number: 5,486,936
[45] Date of Patent: Jan. 23, 1996

[54] OPTICALLY ADDRESSED SPATIAL LIGHT MODULATOR

[75] Inventors: Hideo Fujikake; Kuniharu Takizawa, both of Tokyo; Juichi Hirose; Tatsushi Kobayashi, both of Shizuoka, all of Japan

[73] Assignees: Tomoegawa Paper Co., Ltd.; Nippon Hoso Kyokai, both of Tokyo, Japan

[21] Appl. No.: 35,206

[22] Filed: Mar. 22, 1993

[30] Foreign Application Priority Data

Mar. 25, 1992 [JP] Japan .................................... 4-097348
Mar. 25, 1992 [JP] Japan .................................... 4-097446

[51] Int. Cl.$^6$ .................. G02F 1/13; G02F 1/135; G02F 1/03; G03G 15/02
[52] U.S. Cl. .................. 359/51; 430/20; 430/58; 359/72
[58] Field of Search .......... 359/72, 51; 430/20, 430/57, 58

[56] References Cited

U.S. PATENT DOCUMENTS

| | | | |
|---|---|---|---|
| 4,060,316 | 11/1977 | Pollack et al. | 359/72 |
| 5,170,271 | 12/1992 | Lackner et al. | 359/72 |
| 5,200,283 | 4/1993 | Nakano et al. | 359/72 |
| 5,208,686 | 5/1993 | Fergason | 359/51 |
| 5,260,815 | 11/1993 | Takizawa | 359/41 |
| 5,268,779 | 12/1993 | Shigeta et al. | 359/72 |

FOREIGN PATENT DOCUMENTS

| | | | |
|---|---|---|---|
| 59-128520 | 7/1984 | Japan | 359/72 |
| 4-240623 | 8/1992 | Japan | 359/72 |

*Primary Examiner*—William L. Sikes
*Assistant Examiner*—Ron Trice
*Attorney, Agent, or Firm*—Oblon, Spivak, McClelland, Maier & Neustadt

[57] ABSTRACT

An optically addressed spatial light modulator having a multilayer-type photo conductive layer with a charge carrier generation layer and a charge carrier transport layer having a large mobility. The light modulator also utilizes a liquid crystal composite layer including a transparent resin having a refractive index equal to the refractive index of the liquid crystal. The photoconductive layer and the liquid crystal layer are fixed to each other and the transparent electrodes are fixed to the two opposite sides of these layers. Utilizing the present invention an optically addressed spatial modulator is produced which can write with spectral light such as an infrared ray emitted from a semiconductor laser. The modulator has excellent qualities of sensitivity, light transmittance, hardness and spatial uniformity.

11 Claims, 3 Drawing Sheets

OPTICALLY ADDRESSED SPATIAL LIGHT MODULATOR

BACKGROUND OF THE INVENTION

1. Field of The Invention

The present invention relates to an optically addressed spatial light modulator having a function which can input two-dimensional optical information such as an image and a data pattern by using write light, and can display them by readout light. In particular, the present invention relates to an optically addressed spatial light modulator which can be applied to a projection image spatial light modulator which converts a weak optical image to a bright image, a wavelength convertor of visible optical images, a visualizing device of infrared light images, a fire alarm device, and a convertor from incoherent to coherent light and vice versa.

In recent years, the following spatial light modulators (1)–(4), comprising a photoconductive layer and a liquid crystal layer, were used as optically addressed spatial light modulators.

(1) A spatial light modulator is shown in FIG. 6 wherein a twisted nematic liquid crystal layer 20, with a 45° twist, is sandwiched by two alignments 19,19. Initially, a multilayer dielectric mirror 17 for reflecting light, a light absorbing layer 18, and an amorphous inorganic photoconductive film 1B, comprising amorphous Si are sequentially fixed onto one alignment 19, and then transparent substrates 11 having transparent electrodes 9 are fixed to the sides of the device. In FIG. 6, a number 10 indicates an AC power, and a number 12 indicates a lead wire.

(2) A spatial light modulator wherein alignments, and photoconductive polymer (i.e. polyimide) films are sequentially fixed to both sides of a 90° twisted nematic liquid crystal layer. Then, transparent substrates 11 having transparent electrodes 9 are fixed to the sides of the device.

(3) A spatial light modulator wherein photoconductive polymer crystal films (i.e. polyimide integrated into oligophenylene sulfide which is sensitive to light) are sequentially fixed to both sides of a surface stabilized ferroelectric liquid crystal layer. Then, transparent substrates 11 having transparent electrodes 9 are fixed to the sides of the device.

(4) A spatial light modulator wherein a multilayer dielectric mirror, a light absorbing layer, and an inorganic photoconductive crystal plate ($Bi_{12}SiO_{20}$) are sequentially fixed onto one surface of a layer which is made of a liquid crystal/resin composite (liquid crystal/resin composite layer), and then transparent substrates 11 having transparent electrodes 9 are fixed to the sides of the device.

The disadvantages of the spatial light modulators (1)–(4) are presented hereinbelow.

1. Because the spatial light modulator (1) uses a twisted nematic liquid crystal in the liquid crystal layer, then the thickness of the liquid crystal layer has to be maintained accurately, and therefore it is difficult to produce the spatial light modulator having large dimensions.

2. Because the spatial light modulator (1) uses a twisted nematic liquid crystal in the liquid crystal layer, then a polarizer is necessary. Because in the case of displaying an image by non-polarizing readout light, more than 50% of light is removed by the polarizer, and consequently the displayed image is dark.

3. Because the spatial light modulator (1) uses a twisted nematic liquid crystal in the liquid crystal layer, then the liquid crystal layer is easily deformed and the thickness thereof is malformed easily by stress from external pressure.

4. Because the spatial light modulator (1) uses an amorphous Si is used in the photoconductive layer, then a extensive manufacturing facility such as a chemical vapor deposition (CVD) apparatus, a sputtering apparatus, and a vacuum evaporation apparatus is necessary. Moreover, the length of time for producing a film is long, therefore the efficiency of producing a spatial light modulator is greatly reduced.

5. Because the spatial light modulator (1) uses an amorphous Si is used in the photoconductive layer, then the photoconductive layer has low sensitivity to an infrared ray. Therefore a light beam made by a cheap semiconductor laser cannot be used as a write light.

1. Because the spatial light modulator (2) uses a twisted nematic liquid crystal in the liquid crystal layer, then a production of a spatial light modulator having a large dimensions is difficult.

2. Because the spatial light modulator (2) uses a twisted nematic liquid crystal in the liquid crystal layer, then a polarizer is necessary and, consequently, the displayed image is dark.

3. Because the spatial light modulator (2) uses a twisted nematic liquid crystal in the liquid crystal layer, then the liquid crystal layer is easily deformed by stress from external pressure.

4. Because the spatial light modulator (2) uses a single layer of film made by an organic photoconductive material, the mobility of carriers is low, and therefore the practical sensitivity is inferior.

1. Because the spatial light modulator (3) uses the surface stabilized ferroelectric liquid crystal in the liquid crystal layer, the thickness of the liquid crystal layer has to be controlled extremely thin (i.e. 1 to 3 µm), and therefore it is difficult to produce a spatial light modulator having large dimensions.

2. Because the spatial light modulator (3) uses the surface stabilized ferroelectric liquid crystal in the liquid crystal layer, a polarizer is necessary, and consequently the displayed image is dark.

3. Because the spatial light modulator (3) uses the surface stabilized ferroelectric liquid crystal in the liquid crystal layer, the alignment state of liquid crystal is extremely unstable against mechanical shock, and therefore a display defect easily accrues.

4. Because the spatial light modulator (3) uses the surface stabilized ferroelectric liquid crystal in the liquid crystal layer, it is difficult to form an alignment layer which can orient the liquid crystal molecules uniformly, therefore the spatial light modulator having a uniform property cannot be obtained.

5. Because the spatial light modulator (3) uses the surface stabilized ferroelectric liquid crystal in the liquid crystal layer, the liquid crystal layer has a bistable electric-optic property, and therefore a display having gray scale cannot be obtained.

6. Because the spatial light modulator (3) uses a single layer film made by an organic photoconductive material 1A, the mobility of the carriers is low, and therefore the practical sensitivity is inferior. 1. Because the spatial light modulator (4) uses a single crystal plate, comprised of $Bi_{12}SiO_{20}$, in a photoconductive layer, a light comprised of a long wave length such as an infrared ray and a visible ray, cannot be used as a write light. Therefore the spatial light modulator cannot use the various light sources of the write light.

2. Because the spatial light modulator (4) uses a single crystal plate, comprised of $Bi_{12}SiO_{20}$, in a photoconductive layer, a polishing process is needed for the photoconductive layer, and therefore the productivity of the layer is low.

3. Because the spatial light modulator (4) uses a single crystal plate, comprised of $Bi_{12}SiO_{20}$, in a photoconductive layer, the photoconductive layer is fragile and easily broken when subjected to mechanical shock or oscillation.

SUMMARY OF THE INVENTION

It is therefore an object of the present invention to solve the above problems. In other words, it is the object of the present invention to provide an optically addressed spatial light modulator, which can write with various spectral light such as an infrared ray and the like, and which has good sensitivity, high light transmittance, hardness, good spatial uniformity, high productivity, and the ease in forming a spatial light modulator having large dimensions.

According to a first aspect of the present invention, an optically addressed spatial light modulator is provided, comprising a photoconductive layer, a liquid crystal layer, and transparent electrodes characterized in that:

the photoconductive layer is a multilayer-type photoconductive layer comprising a charge carrier generation layer which is made of one kind or more than two kinds of photoconductive material, and a charge carrier transport layer which is made of a carrier material having a large mobility;

the liquid crystal layer is a liquid crystal/resin composite layer comprising a nematic liquid crystal, cholesteric liquid crystal, smectic liquid crystal, or a blended liquid crystal, and a transparent resin having an equivalent refractive index to the ordinary refractive index of the liquid crystal, where either the resin is dispersed into the liquid crystal, or the liquid crystal is dispersed into the resin; and the multilayer-type photoconductive layer and the liquid crystal/resin composite layer are fixed to each other and the transparent electrodes are fixed to the two diametrically opposite side of these layers.

According to a second aspect of the present invention, an optically addressed spatial light modulator is provided, comprising a photoconductive layer, a liquid crystal layer, and transparent electrodes characterized in that:

the photoconductive layer is a monolayer-type photoconductive layer comprising one kind or more than two kinds of a photoconductive material and a binder resin, and the photoconductive material is dispersed in the binder resin;

the liquid crystal layer is a liquid crystal/resin composite layer comprising a nematic liquid crystal, cholesteric liquid crystal, smectic liquid crystal, or a blended liquid crystal of these liquid crystals, and a transparent resin having an equivalent refractive index to the ordinary refractive index of the liquid crystal, where the resin is dispersed in the liquid crystal, or the liquid crystal is dispersed in the resin; and the monolayer-type photoconductive layer and the liquid crystal/resin composite layer are fixed to each other and then the transparent electrodes are fixed to the two diametrically opposite side of these layers.

The following is a description of the optically addressed spatial light modulator of the first aspect of the present invention.

The optically addressed spatial light modulator has a multilayer-type photoconductive layer comprising a charge carrier generation layer and a charge carrier transport layer. The charge carrier generation layer is comprised of a photoconductive material and a binder resin. The photoconductive material is fixed with the binder resin. However, it is not necessary to always use the binder resin. It is possible to comprise the charge carrier generation layer with only one kind or more than two kinds of the photoconductive material.

Representative examples of the photoconductive material include photoconductive organic pigments or dyes such as a phthalocyanine pigments, azo pigments (include a bisazo pigment, trisazo pigments), polycyclic quinone pigments, perylene pigments, perynone pigments, anthraquinone pigments, indigo pigments, thioindigo pigments, dioxadine pigments, azolake pigments, thiapyrylium dyes, quinacridone pigments, cyanin dyes, merocyanine dyes, pyrrole pigments, porphyrin pigments, anthanthrone pigments, squarilium dyes, azulenium dyes, and the like, and photoconductive inorganic materials such as ZnO, TiO, CdS, CdSe, Se, amorphous Se, Si, amorphous Si, SeTe, amorphous SeTe, SeAs, amorphous SeAs, GaAs, GaP and the like. These photoconductive materials are used independently, or by blending the different kinds of photoconductive organic pigments, dyes, or photoconductive inorganic materials.

It is possible to obtain various spectral sensitivities of the spatial light modulator, depending on the combination of the photoconductive materials. Therefore, it is possible to adjust the properties of spectral sensitivity of the spatial light modulator according to the spectrum of the write light. In particular, when the photoconductive organic pigments or dyes which are influenced by infrared ray such as a pyrolpyrrol pigment, metal-free phthalocyanine, metal phthalocyanine (for example, chloroaluminum phthalocyanine chloride, vanadium phthalocyanine, titanium phthalocyanine, and the like), trisazo pigments, squarilium dyes, azulenium dyes, anthanthrone pigments, and the like are used, a write light within the infrared range (i.e. 780 to 1000 nm) can be used. In particular, 1,4-dithioketo-3,6-diphenylpyrrolo[3,4-C]pyrrole, X-type metal-free phthalocyanine, τ-type metal-free phthalocyanine, titanium phthalocyanine, copper phthalocyanine, chloroaluminum phthalocyanine, zinc phthalocyanine, vanadium phthalocyanine, or dibromo anthanthrone, can efficiently operate the spatial light modulator with write light having a long wavelength within the visible ray range or an infrared ray which is made by a cheap semiconductor laser or a cheap light emitting diode.

When the grain diameter of the photoconductive material is too large, the resolution of the spatial light modulator is diminished. Therefore, the practical grain diameter of the photoconductive material is less than 100 μm.

As a binder resin, a hard resin is preferable. Representative examples of the hard resin include polyvinyl chloride, acrylate, methacrylate, urethane, polyimide, vinyl acetate, phenol aldehyde, epoxy, cellulose, polyethylene, polypropylene, melanin, polyester, polyvinyl butyral, polyvinyl carbazole, polyvinyl acetate, polycarbonate, polystyrene, silicone, or a copolymer of these materials (for example, a styrene/butadiene copolymer).

The charge carrier transport layer is comprised of a charged transferring material and a resin. Representative examples of the preferable charge carrier transport material include hydrazone, stilbene, polyvinyl carbazole (PVK), pyrazoline, oxazole, oxadiazole, triphenylmethane, amine derivatives (for example, triarylamine, and the like), N-phenylcarbazole, butadiene derivatives, fluorenone derivatives, diphenoquinone derivatives and the like. When these charge carrier transport materials are used, they are blended into the resin. If the response speed of the multilayer-type photoconductive layer becomes too high, then the practical sensitivity of the spatial light modulator can be increased by forming the charge carrier transport layer.

A charge carrier generation layer is formed with a coating of the solution in which the photoconductive material and the binder resin are dissolved, employing a coating method such as roll coating, dipping, spin coating, casting, spraying, blading, wire bar coating, and the like. Similarly, the charge transferring layer is formed by coating the solution of which the charge carrier transport material and resin are dissolved. Therefore, the charge carrier generation layer and the charge carrier transport layer are produced by an extremely efficient process and can be formed in large quantities, at once. Besides the above-mentioned methods, it is possible to form the layers by forming films and solidifying them using a hard resin that is set by light, heat, and chemical reaction.

Moreover when the charge carrier generation layer is comprised of one kind or multiple kinds of photoconductive material only and without binder resin, the charge carrier generation layer is formed by a method such as a vacuum evaporation, spattering chemical vapor deposition (CVD), ion plating, or the like.

When the charge carrier generation layer is comprised of the photoconductive material and the resin, the thickness thereof is preferably between 0.1 to 5 μm. When the charge carrier generation layer is comprised of the photoconductive material alone, the thickness thereof is preferably between 1 to 40 μm.

According to the multilayer-type photoconductive layer of the optically addressed spatial light modulator of the first aspect of the present invention, it is possible to obtain sensitivity to a spectrum of light including infrared ray that is greater than 800 nm in wave length, depending on the combination of the photoconductive materials. Therefore, it is possible to modulate the sensitivity of the spatial light modulator to the spectrum of the write light. Namely, problem 5 of the spatial light modulator (1) and problem 1 of the spatial light modulator (4) can be solved.

Moreover, the response speed becomes fast and it is possible to obtain effective high sensitivity by forming a charge carrier transport layer including carriers of high mobility. Namely, problem 4 of the spatial light modulator (2) and problem 6 of the spatial light modulator (3) can be solved.

The multilayer-type photoconductive layer is formed employing a simple process such as a roll coating, dipping, spraying, blading, wire bar coating, and the like. The multilayer-type photoconductive layer having large dimensions can be formed in a short time. Therefore, the multilayer-type photoconductive layer can be formed very easily and the efficiency of mass producing the spatial light modulator is excellent. Namely, problem 4 of the spatial light modulator (1) and problem 2 of the spatial light modulator (4) can be solved.

The charge carrier transport layer of the first aspect of the present invention is solidified with a hard resin. Therefore, the charge carrier transport layer resistant to mechanical shock, stress from external pressure, and problem 3 of the spatial light modulator (4) can be solved.

As a light modulating layer of the optically addressed spatial light modulator of the first aspect of the present invention, a liquid crystal/resin composite layer is used, wherein liquid crystals having a droplet state or a connecting state are dispersed in the transparent resin. The ordinary refractive index ($n_o$) is equivalent to the refractive index ($n_p$) of the transparent resin. The light scattering effect of the liquid crystal is accrued by the mismatching between the extraordinary refractive index ($n_e$) and the refractive index ($n_p$) of the transparent resin. Therefore the larger birefringence ($\Delta n$; $\Delta n = n_e - n_o$) of the liquid crystal is more suitable than the smaller.

As a liquid crystal of the liquid crystal/resin composite layer, a liquid crystal such as nematic liquid crystal, cholesteric liquid crystal, smectic liquid crystal, or a blended liquid crystal of these liquid crystals, having a large birefringence, is used. However, when a high speed response is desired, a nematic liquid crystal having low viscosity and a high elastic constant is most suitable.

In particular, those nematic liquid crystals having a skeleton with a large birefringence such as cianobiphenyl skeleton, a terphenyl skeleton, a pyridine skeleton, a pyrimidine skeleton, or a tolane skeleton are most suitable.

As the transparent resin composite with the above-mentioned nematic liquid crystals, a resin such as acryl, methacryl, epoxy, an urethane, a polystyrene, a polyvinyl alcohol, or a copolymer of these materials (for example, an acryl/urethane copolymer), which have an ordinary refractive index ($n_p$) that is approximately between 1.5 to 1.6, is used.

The liquid crystal/resin composite layer is formed by homogenizing liquid crystal and transparent resin, the solidifying only the transparent resin composition employing a light reaction process, a heat reaction process, or a chemical reaction process, and followed by insolubilizing the liquid crystal, depositing, and coagulating it (in the separating phase). Moreover, the liquid crystal/resin composite layer can be obtained by dissolving the resin and the liquid crystals in a common solvent, then evaporating off the solvent.

In these forming methods, when the speed of solidifying is larger, the size of the droplet of liquid crystal becomes smaller. In order to uniformly scatter the visible ray comprised of various wave lengths, it is necessary that the size of the droplet of the liquid crystal be greater than 0.5 μm. However, when the size of the droplet is too large, the amount of scattered light decreases. Therefore, the practical size of the droplet of the liquid crystal is preferably between 0.5 to 10 μm. Moreover, when a larger amount of the liquid crystal is included in the layer than that of the transparent resin, the droplets of the liquid crystal are connected to each other, and the structure of the transparent resin may forms a sponge like structure or a network. Besides the above-mentioned forming method of the liquid crystal/resin composite layer, the layer can be formed by impregnating a film made by resin having small holes or a fibrous resin with the liquid crystal.

Most of liquid crystal/resin composite layer is self-supporting, therefore the control of the thickness thereof is easy. In addition, it is possible to form a layer having huge dimensions. However, when the resin is soft, in order to support the sides of the liquid crystal/resin composite layer, spacers may be positioned between the two transparent electrodes. In order to obtain a sufficient amount of scattered light, the thickness of the liquid crystal/resin composite layer is preferably greater than 5 μm.

Because the liquid crystal layer of the optically addressed spatial light modulator of the first aspect of the present invention is the liquid crystal/resin composite layer having a self-supporting structure, it is easy to maintain the thickness thereof. Consequently, it is possible to produce a spatial light modulator having large dimensions. Namely, problem 1 of the spatial light modulators (1)–(3) can be solved.

Because the liquid crystal/resin composite layer utilizes the light scattering effect, the polarizer is not necessary. Therefore, a high transmission of light can be obtained. Namely, problem 2 of the spatial light modulators (1)–(3) can be solved.

Because the liquid crystal included in the liquid crystal/resin composite layer is fixed with the resin, the layer is stable, and resistant to mechanical shock, and stress from external pressure. Namely, problem 3 of the spatial light modulators (1)–(3) can be solved.

Because the alignment layers are not necessary for the liquid crystal/resin composite layer, a high uniformity of molecular orientation can be obtained. Namely, problem 4 of the spatial light modulator (3) can be solved.

Moreover, compared to a threshold curve which in the property of the transmittance versus the applied voltage of for the twisted nematic liquid crystal layer and the ferroelectric liquid crystal layer, the threshold curve of the liquid crystal/resin composite layer is not steep. Consequently, the optically addressed spatial light modulator of the present invention is suitable for the gray scale display. Namely, problem 5 of the spatial light modulator (3) can be solved.

The following is a description of the optically addressed spatial light modulator of the second aspect of the present invention.

The optically addressed spatial light modulator has the liquid crystal/resin composite layer and a monolayer-type photoconductive layer. That is, the spatial light modulator of the first aspect of the present invention has the multilayer-type photoconductive layer, and the spatial light modulator of the second aspect of the present invention has the monolayer-type photoconductive layer.

The monolayer-type photoconductive layer is comprised of a resin and a photoconductive material. The resin and the photoconductive material are those which comprise the charge carrier generation layer of the optically addressed spatial light modulator of the first aspect of the present invention. However, in the case where the definition of the spatial light modulator is taken into consideration, the combination of the photoconductive material having a low dielectric constant and the binder resin, is suitable. Moreover, it is possible to make the response speed fast, and to increase the practical sensitivity of the spatial light modulator by mixing a charge carrier transport material having high carrier mobility such as hydrazone, stilbene, polyvinyl carbazole (PVK), pyrazoline, oxazole, trioxadiazole, triphenylmethane, amine derivatives (for example, triarylamine, and the like), N-phenylcarbazole, butadiene derivatives, fluorenone derivatives, diphenoquinone derivatives, and the like in the binder resin.

Such a monolayer-type photoconductive layer of the present invention is formed by coating of the solution which is formed by dissolving the binder resin in the solvent, then mixing the photoconductive material into the solution. Representative examples of the coating method include roll coating, dipping, spin coating, casting, spraying, blading, wire bar coating, and the like. The thickness of the monolayer-type photoconductive layer can be controlled within a range between 0.01 μm and 100 μm. Therefore the monolayer-type photoconductive layer is formed very easily and the mass production thereof is excellent. Besides the above-mentioned producing methods, it is possible to produce the layer by dispersing and fixing the photoconductive material in the optical reactive resin, thermoreactive resin, or chemically reactive resin.

In depositing the monolayer-type photoconductive layer onto the liquid crystal/resin composite layer, in order to prevent the contacting of the solvent of the liquid crystal/resin composite layer to a binder resin of the monolayer-type photoconductive layer, a barrier layer made of polyvinyl butyral resin, polyamide resin, or the like is suitably positioned between these layers.

The effects, which are the same as the effects which are obtained by the charge carrier generation layer of the optically addressed spatial light modulator of the first aspect of the present invention, can be obtained by the monolayer-type photoconductive layer.

The liquid crystal/resin composite layer of the spatial light modulator of the second aspect of the present invention can be obtained by the same manner with the same materials as the liquid crystal/resin composite layer of the spatial light modulator of the first aspect of the present invention. Consequently, the effects which are the same as the effects which are obtained by the liquid crystal/resin composite layer of the spatial light modulator of the first aspect of the present invention, can be obtained by the liquid crystal/resin composite of the spatial light modulator of the second aspect of the present invention.

DETAILED DESCRIPTION OF PREFERRED EMBODIMENTS

The present invention will be explained in detail hereinbelow with reference to the examples. [First Embodiment]

Figure 1:
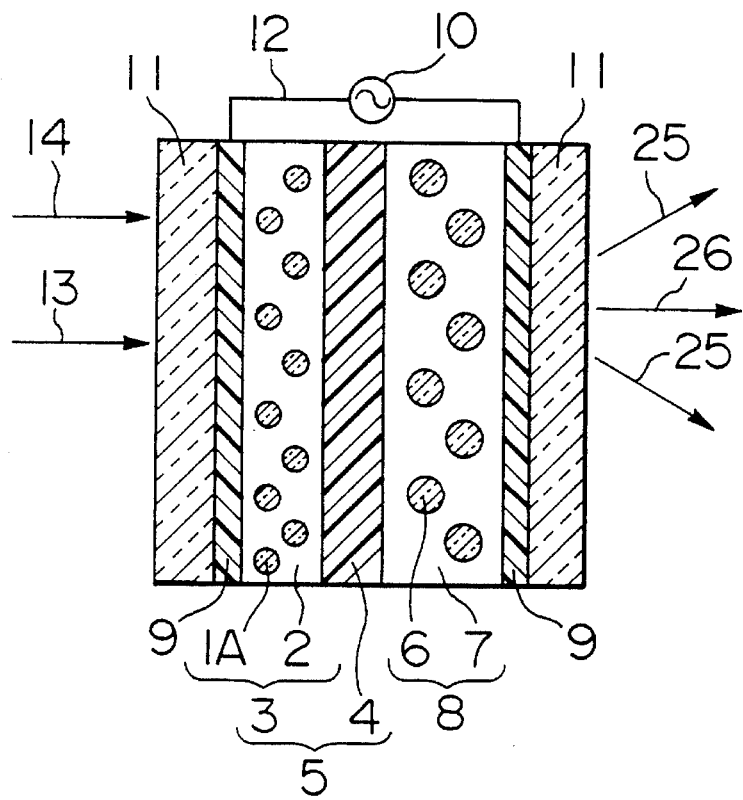
FIG. 1 is a side view, showing one of the optically addressed spatial light modulators of the first aspect of the present invention.

FIG. 1 is a schematic of the side view, showing one of the optically addressed spatial light modulators of the present embodiment.

This spatial light modulator is comprised of a multilayer-type photoconductive layer 5, a liquid crystal/resin composite layer 8, two transparent electrodes 9, 9, and AC power 10.

Moreover, the multilayer-type photoconductive layer 5 is comprised of:

a charge carrier generation layer 3 which is comprised of resin 2 and grains made of photoconductive material 1A which are dispersed in the resin, wherein grains made of photoconductive material 1A generate charged carriers (electrons and electron holes) by light irradiation; and a charge carrier transport layer 4 comprised of a charge carrier transport material having high carrier mobility.

The liquid crystal/resin composite layer 8 is comprised of liquid crystal 6 and a transparent resin 7. The liquid crystal/resin composite layer 8 varies the amount of light scattered, depending on the applied voltage.

These two layers, the multilayer-type photoconductive layer 5 and the liquid crystal/resin composite layer 8, are fixed to each other. Furthermore, the two transparent electrodes 9,9 and two transparent substrates 11,11 are sequentially fixed to the sides of the device. The transparent electrodes 9,9 fixed to the transparent substrates 11,11 are connected to the AC power 10 by a lead wire 12.

When a readout light 13 is incidented with a write light 14 (input light) on the spatial light modulator from the direction of the multilayer-type photoconductive layer 5, the readout light 13 become scattered light 25 and the display light 26 (straightly transmitted light) in the liquid crystal/resin composite layer 8. The write light 14 is comprised of waves having high sensitivity so as to make the charge carrier generation layer 3 photoconductive. The readout light 13 is comprised of waves having low sensitivity so as not to be absorbed by the charge carrier generation layer 3.

The following is a description of a method of producing optically addressed spatial light modulator of the present embodiment. In this embodiment, the multilayer-type photoconductive layer 5 was first produced, and then the liquid crystal/resin composite layer 8 was subsequently produced.
(Producing the multilayer-type photoconductive layer)

The coating solution for the charge carrier generation layer was formed by dispersing 2 g of X-type metal-free phthalocyanine, 1 g of polyvinyl butyral (trade name: #4000-1, marketed by DENKI KAGAKU KOGYO KABUSHIKI KAISHA), and 97 g of dichloroethane for 1 hour using a dispersing apparatus with glass beads. The charge carrier generation layer 3 was produced by coating the solution onto the transparent electrode 9 (made of $In_2O_3$:Sn) fixed to the transparent glass 11 employing a roll coating method, drying for 10 minutes at 60 °C., and then vacuum drying at 50° C. for 3 hours. The thickness of the obtained charge carrier generation layer 3 is 0.3 μm.
(Producing charge carrier transport layer)

The coating solution for the charge carrier transport layer 4 was formed by mixing together and then dissolving 10 g of Hydrazone compound indicated by the following chemical structural formula:

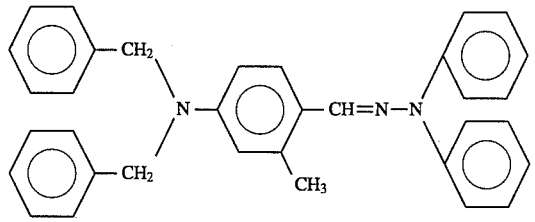

10 g of polycarbonate (trade name: Panlite L1250, marketed by Teijin Kasei Co.), and 80 g of dichloroethane.

The charge carrier transport layer 4 was obtained by coating the solution onto the charge carrier generation layer 3 employing a roll-coating method, drying for 10 minutes at 60° C., and then vacuum drying at 50° C. for 3 hours. The thickness of the obtained charge carrier transport layer 4 was 10 μm.

Therefore, the multilayer-type photoconductive layer 5 comprised of the charge carrier generation layer 3, and the charge carrier transport layer 4 can be produced.
(Producing liquid crystal/resin composite layer)

The nematic liquid crystal 6 having a large birefringence ($n_o$=1.527, $n_e$=1.807, trade name:BL-008, marketed by Merck Japan) and acrylurethane resin (optical setting resin) were mixed, at a weight ratio of 1:1. Furthermore, 0.1 weight % of spherical spacers (grain diameter: 10 μm) were added to the mixture. The liquid crystal/resin composite layer including a liquid crystal droplet 6 with a grain diameter of 1 to 3 μm, was formed by dripping the obtained mixture onto the multilayer-type photoconductive layer 5 fixed with the transparent substrate 11, then superimposing another transparent substrate 11 fixed with a transparent electrode 9, and irradiating the liquid crystal/resin composite layer with ultraviolet ray (wave length: 365 nm, intensity: 20 mW/cm²) from the side of the transparent substrate 11. The thickness of the obtained liquid crystal/resin composite layer 3 is 10 μm.

The optically addressed spatial light modulator shown in FIG. 1, was produced by forming the multilayer-type photoconductive layer 5 and the liquid crystal/resin composite layer 8 which are positioned between the transparent electrodes 9,9.

The obtained optically addressed spatial light modulator has an effective dimension of 40 mm by 40 mm.

In order to prevent the contacting of the solvent of the liquid crystal/resin composite layer 8 to a binder resin of the charge carrier transport layer 4, when depositing the liquid crystal/resin composite layer 8 onto the charge carrier transport layer 4, the barrier layer made of polyvinyl butyral resin, polyamide resin, or the like is preferably positioned between the composite layer 8 and the charge carrier transport layer 4.

The liquid crystal/resin composite layer 8 and the multilayer-type photoconductive layer 5 of the spatial light modulator of the present embodiment, have a self-supporting structure respectively, and therefore the control of the thickness thereof is easy. In addition, it is possible to maintain the thickness of these layers which have large dimensions. Consequently, according to the optically addressed spatial light modulator of the present embodiment, it is possible to form a spatial light modulator having large dimensions.

Moreover, the optically addressed spatial light modulator of the present embodiment, has the liquid crystal/resin composite layer 8 and the multilayer-type photoconductive layer 5 which have a self-supporting structure respectively. Consequently, the spatial light modulator is stable and resistant to mechanical shock, stress from external pressure, and varying temperature.
(Operating of the spatial light modulator)

The following is a description of the operation of the spatial light modulator shown in FIG. 1 of the present embodiment. When the write light 14 is not incidented to the spatial light modulator, the multilayer-type photoconductive layer 5 having a lower dielectric constant than that of the liquid crystal/resin composite layer 8 is applied with most of driving voltage. Therefore, because the liquid crystal molecules in the liquid crystal/resin composite layer 8 are influenced with the surface of the resin, their direction of orientation (i.e. alignment) will not be uniform. Consequently, the readout light 13 which is passed through the multilayer-type photoconductive layer 8, reflects and refracts repeatedly, and intensively scatters due to the mismatching between the refractive index of the liquid crystal droplet 6 and that of the resin 7.

When the write light 14 having sufficient intensity is incident to the spatial light modulator, carriers (electrons or electron holes) traveled in the charge carrier transport layer 4, are generated in the charge carrier generation layer 3. Therefore the impedance of the multilayer-type photoconductive layer 5 is decreased, when a part of the voltage which is applied in the multilayer-type photoconductive layer 5, is transferred to the liquid crystal/resin composite layer 8. When the voltage is transferred to the layer 8, the liquid crystal molecules having a positive anisotropy associated with the dielectric constant are orientated in the direction of the electric field. Therefore, the refractive index of the liquid crystal molecules 6 approaches the ordinary refractive index ($n_o$), and becomes equivalent to the refractive index of resin 7 ($n_p$). Consequently, the mismatching of the refractive indices is eliminated and the readout light 13 incidented to the spatial light modulator, can pass through the liquid crystal/resin composite layer 8 in the present state. When the straightly transmitted light (display light) 26 alone is chosen from the readout light 13 which passes through the liquid crystal/resin composite layer 8, the optical image which is displayed by the display light 26 and modulated by the write light 14, can be obtained. As a result, it is possible to change the wavelength and the light intensity in the optical image.

The deterioration of the spatial resolution of the optically addressed spatial light modulator can be reduced to a minimum by using a multilayer-type photoconductive layer 5 having high dark-resistivity, and comprising resin 2.

When the division of voltage between the multilayer-type photoconductive layer 5 and the liquid crystal/resin composite layer 8 is taken into consideration, it is possible to make the multilayer-type photoconductive layer thinner by using a multilayer-type photoconductive layer 5 with a lower dielectric constant. Consequently, the spatial resolution of the optically addressed spatial light modulator can be increased.

Figure 2:
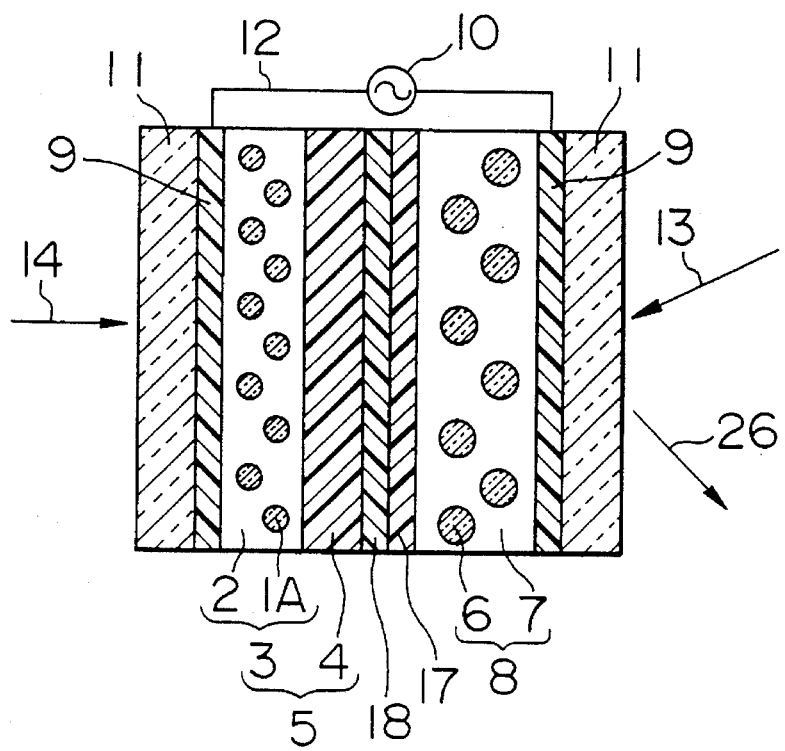
FIG. 2 is a side view, showing another optically addressed spatial light modulator of the first aspect of the present invention.

In order to increase the transmittance of the readout light (i.e. ratio of the maximum intensity of the display light 26 to the intensity of the readout light 13) of the spatial light modulator, and to enable a display using a readout light comprising the desired wave length, it is better to separate the readout light 13 and the write light 14, shown in FIG. 2. The readout light 13 and the write light 14 can be separated by sequentially depositing a multilayer comprised of dielectric materials (for example, the layer is comprised of film of $SiO_2$ and $TiO_2$) which reflect the readout light 13, and a light absorbing layer 18 such as a film comprised of CdTe which absorbs the readout light leaked from the multilayer, between the multilayer-type photoconductive layer 5 and the liquid crystal/resin composite layer 8. In this case, the write light 14 and the readout light 13 are respectively incidented from the side of the multilayer-type photoconductive layer 5 and the liquid crystal/resin composite layer 8. The intensity of the reflected light 26 (display light) of the readout light 13 is modulated, depending on the intensity of the write light 14. When the wavelength of the readout light 13 is not influenced by the charge carrier generation layer 3, the spatial light modulator does not require the light absorbing layer 13. In this case, the reflectance of the surface of the multilayer 17 comprised of dielectric material which is diminished, is caused by the processing of the pigment included in the multilayer-type photoconductive layer 5. In order to solve this problem, it is preferable to position an under layer comprised of polymethacrylate resin, or polycarbonate resin between the multilayer-type photoconductive layer 5 and the multilayer 17 of dielectric material.

Moreover, as a substitute for the multilayer 17 comprised of dielectric material, a metallic film of aluminum, or chromium, which is finely divided at an interval of 1 to 500 µm, and is electrically insulated, can be used. (Second Embodiment)

Figure 3:
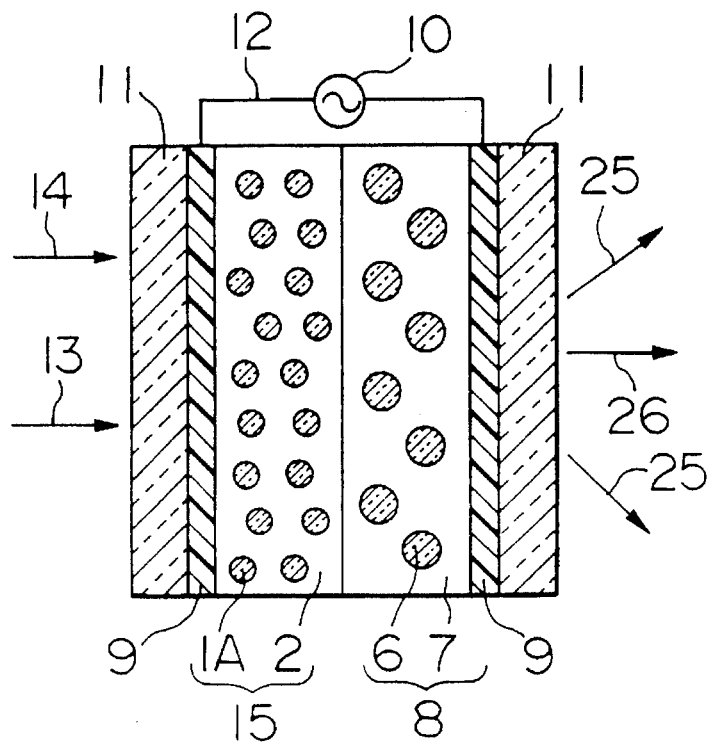
FIG. 3 is a side view, showing one of the optically addressed spatial light modulators of the second aspect of the present invention.

FIG. 3 is a schematic of the side view, showing one of the optically addressed spatial light modulators of the present embodiment.

This spatial light modulator is comprised of a monolayer-type photoconductive layer 15, a liquid crystal/resin composite layer 8, two transparent electrodes 9, and AC power 10.

Moreover, the monolayer-type photoconductive layer 15 is comprised of binder resin 2 and grains made of photoconductive material 1A. The impedance of photoconductive material 1A is decreased, when write light is irradiated it. The grains made of photoconductive material 1A are dispersed in the binder resin 2.

The liquid crystal/resin composite layer 8 is comprised of liquid crystal 6 and a transparent resin 7. The liquid crystal/resin composite layer 8 modulates the readout light, depending on the applied voltage.

These two layers, the monolayer-type photoconductive layer 5 and the liquid crystal/resin composite layer 8, are fixed to each other. Furthermore, the two transparent electrodes 9,9 and two transparent substrates 11,11 are sequentially fixed to the sides. The transparent electrodes 9,9 fixed to the transparent substrates 11 are connected to the AC power 10 by a lead wire 12.

When the readout light 13 is incidented with the write light 14 (input light) to the spatial light modulator from the direction of the monolayer-type photoconductive layer 15, the readout light 13 becomes scattered light 25 and a display light 26 (straightly transmitted light) in the liquid crystal/resin composite layer 8. The write light 14 is comprised of waves having high sensitivity so as to make the charge carrier generation layer 3 photoconductive. The readout light 13 is comprised of waves having low sensitivity so as not to be absorbed by the charge carrier generation layer 3.

The following is a description of a method of producing the optically addressed spatial light modulator of the present embodiment. In this embodiment, the monolayer-type photoconductive layer 15 was first produced, then the liquid crystal/resin composite layer 8 was subsequently produced. (Producing the monolayer-type photoconductive layer)

The coating solution for the monolayer-type photoconductive layer 15 was formed by dispersing 2 g of X-type metal-free phthalocyanine (grain diameter: approximately 0.5 µm), 6 g of polyester resin (trade name: Elitel UE-3200, marketed by UNITIKA Ltd.), and 72 g of dichloroethane for 1 hour, using a dispersing apparatus with glass beads. The monolayer-type photoconductive layer 15 was produced by coating the solution onto the transparent electrode 9 (made of $In_2O_3$:Sn) fixed to the transparent glass 11 employing a roll coating method, drying for 10 minutes at 60 °C., and then vacuum drying at 50° C. for 3 hours. The thickness of the obtained monolayer-type photoconductive layer 15 is 10 µm. When the absorption spectroscopic property of the monolayer-type photoconductive layer 15 was examined, it was understood that because the wave range where there was strong absorption was as wide as 500 to 800 nm, the wave comprising the wavelength within the range of the green ray to infrared ray could therefore be used as write light 14. Because the absorption of the blue ray, which has a wavelength of approximately 485 nm is weak, the light can be used as readout light 13.

(Producing liquid crystal/resin composite layer)

The liquid crystal/resin composite layer 8 comprised of liquid crystal 6 having a droplet state or connecting state, and transparent resin 7, wherein the liquid crystal 6 is dispersed, is used as the light modulating layer of the embodiment. The ordinary refractive index ($n_o$) of used liquid crystal 6 is equivalent to the refractive index ($n_p$) of the transparent resin 7. The light scattering effect of the liquid crystal/resin composite layer 8 is accrued by the mismatching between the extraordinary refractive index ($n_e$) of liquid crystal 6 and the refractive index ($n_p$) of the transparent resin 7. Therefore, the larger birefringence ($\Delta n$; $\Delta n = n_e - n_o$) of the liquid crystal 6 is more suitable than the smaller.

The nematic liquid crystal 6 having large birefringence ($n_o = 1,527$, $n_e = 1,807$, trade name:BL-008, marketed by Merck Japan) and acrylurethane resin (optical setting resin, $n_p = 1,524$, trade name:NOA-65, marketed by Norland Product Co.) were mixed at a weight ratio of 1:1. Furthermore, 0.1 weight of spherical spacers (grain diameter: 10 µm) were added to the mixture. The liquid crystal/resin composite layer 8 including a droplet of liquid crystal 6 with a grain diameter of 1 to 3 µm, was formed by dripping the obtained mixture onto the monolayer-type photoconductive layer 15 fixed with the transparent substrate 11, then superimposing the another transparent substrate 11 fixed with a transparent electrode 9, and irradiating the liquid crystal/resin composite layer 8 with ultraviolet ray (wave length: 365 nm, intensity: 20 mw/cm$^2$) from the side of the transparent substrate 11. The thickness of the obtained liquid crystal/resin composite layer 8 is 10 µm.

The optically addressed spatial light modulator shown in FIG. 3 can be produced by forming the monolayer-type photoconductive layer 15 and the liquid crystal/resin composite layer 8 which are positioned between the transparent electrode 9,9.

The obtained optically addressed spatial light modulator has an effective dimension of 40 mm by 40 mm.

In order to prevent the contacting of the solvent of the liquid crystal/resin composite layer 8 to a binder resin of the monolayer-type photoconductive layer 15, when depositing the liquid crystal/resin composite layer 8 onto the monolayer-type photoconductive layer 15, a barrier layer made of polyvinyl butyral resin, polyamide resin, or the like is preferably positioned between the composite layer 8 and the monolayer-type photoconductive layer 15.

The liquid crystal/resin composite layer 8 and the monolayer-type photoconductive layer 15 of the spatial light modulator of the present embodiment, have a self-supporting structure, and therefore the control of the thickness thereof is easy. In addition, it is possible to maintain the thickness of these layers which have a large dimensions. Consequently, according to the optically addressed spatial light modulator of the present embodiment, it is possible to form a spatial light modulator having large dimensions.

Moreover, the optically addressed spatial light modulator of the present embodiment, has the liquid crystal/resin composite layer 8 and the monolayer-type photoconductive layer 15 which have a self-supporting structure. Consequently, the spatial light modulator is stable and resistant to mechanical shock, and stress from external pressure, and varying temperature.

(Operating of the spatial light modulator)

The following is a description of the operation of the spatial light modulator shown in FIG. 3 of the present embodiment.

When the write light 14 is not incidented to the spatial light modulator, the monolayer-type photoconductive layer 15 having a lower dielectric constant than that of the liquid crystal/resin composite layer 8 is applied with most of the driving voltage. Therefore, because the liquid crystal molecules comprising the liquid crystal/resin composite layer 8 are influenced with the surface of the resin, their direction of orientation (alignment) is not uniform. As a result, the readout light 13 which is passed through the monolayer-type photoconductive layer 15, reflects and refracts repeatedly, and intensively scatters due to the mismatching between the refractive index of the liquid crystal droplet 6 and that of the resin 7.

When the write light 14 having sufficient intensity is incidented to the spatial light modulator, because an impedance of the monolayer-type photoconductive layer 15 is decreased, a part of the voltage which is applied in the monolayer-type photoconductive layer 15 is transferred to the liquid crystal/resin composite layer 8. When the voltage is transferred to the layer 8, the liquid crystal molecules having a positive anisotropy of the dielectric constant, are orientated in the direction of the electric field. Therefore, the refractive index of the liquid crystal molecules 6 approaches the ordinary refractive index ($n_o$), and becomes equivalent to the refractive index of resin 7 ($n_p$). Consequently, the mismatching of the refractive indices is eliminated, and the readout light 13 incidented to the spatial light modulator, can pass through the liquid crystal/resin composite layer 8 in the present state. When the straightly transmitted light (display light) 26 alone is chosen from the readout light 13 which passes through the liquid crystal/resin composite layer 8, the optical image which is displayed by the display light 26 and modulated by the write light 14, can be obtained. As a result, it is possible to change the wavelength and the light intensity in the optical image.

Because a monolayer-type photoconductive layer 15 having high dark-resistivity and including resin 2 is used, the diffusion of photo-carriers can be prevented. Therefore, the deterioration of spatial resolution of the optically addressed spatial light modulator can be reduced to a minimum.

When the division of voltage between the monolayer-type photoconductive layer 15 and the liquid crystal/resin composite layer 8 is taken into consideration, when the dielectric constant of the monolayer-type photoconductive layer 15 is lower, it is possible to make the monolayer-type photoconductive layer 15 thinner. Consequently, the spatial resolution of the optically addressed spatial light modulator can be increased.

Figure 4:
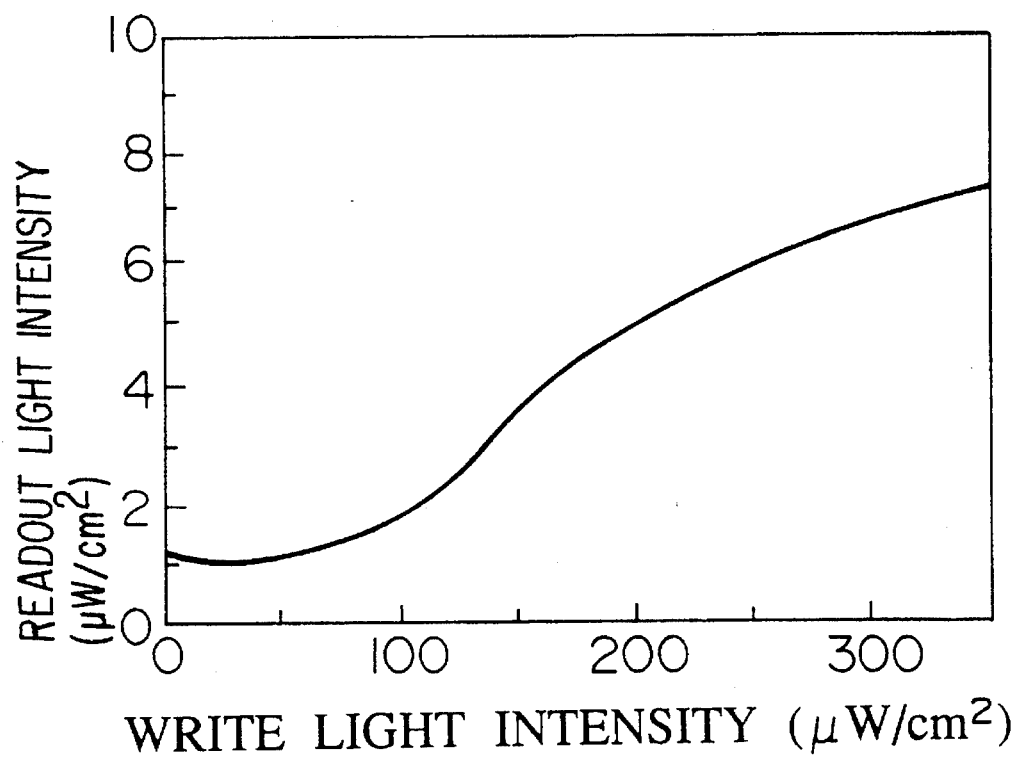
FIG. 4 shows a relation between write light intensity and transmitted readout light intensity.
Figure 5:
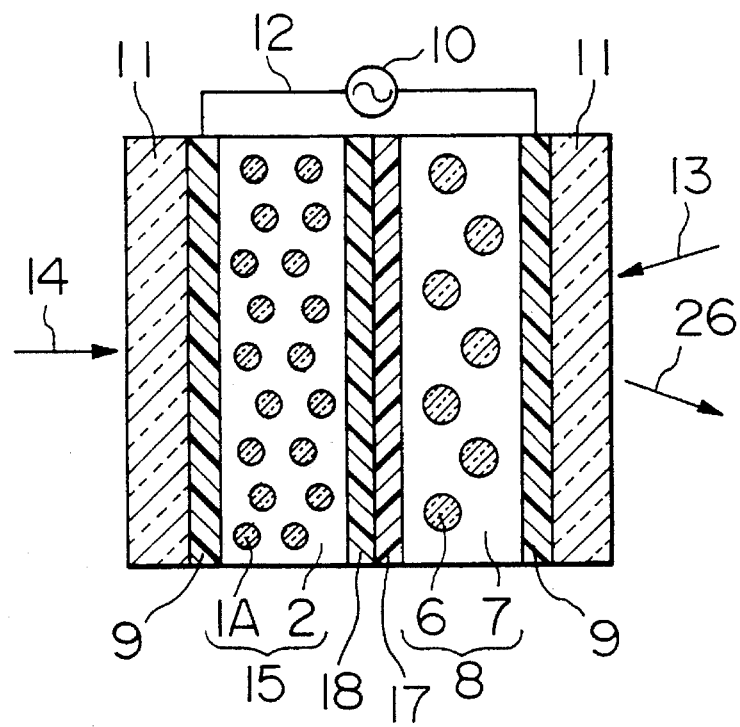
FIG. 5 is a side view, showing another optically addressed spatial light modulator of the second aspect of the present invention.
Figure 6:
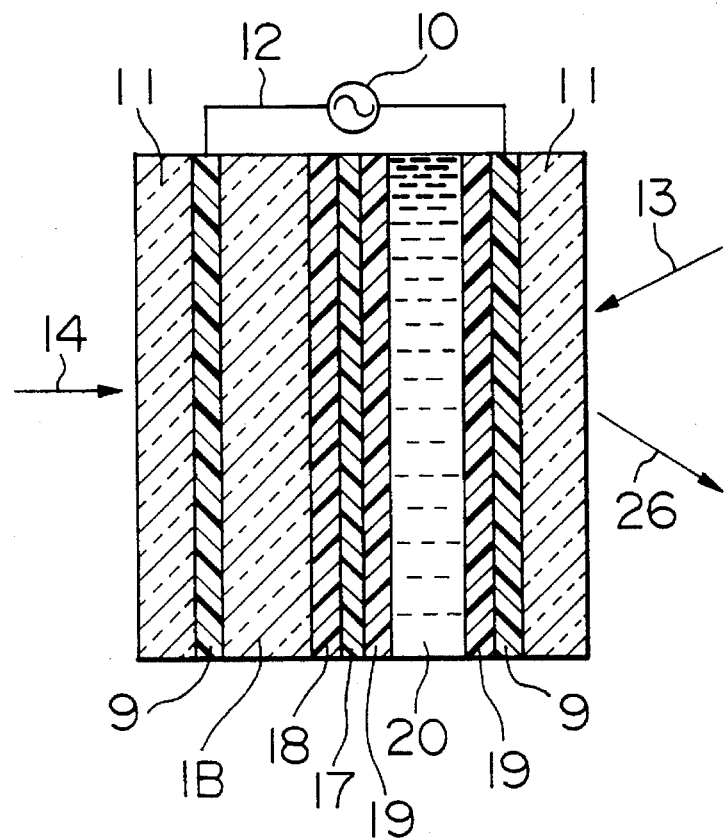
FIG. 6 is a side view, showing a conventional optically addressed spatial light modulator.

FIG. 4 show the result of incidenting blue readout light 13, having an intensity of 140 µW/cm$^2$ (wavelength: 480 to 490 nm), to the spatial light modulator shown in FIG. 3 which was applied with voltage of 100 V, and examining of the intensity of straightly transmitted light of readout light 13 by varying the intensity of write light 14 of an infrared range (wavelength range: 700 to 800 nm) which is produced by xenon lamp. In FIG. 4, the axis of abscissa indicates the intensity of the write light (i.e. corresponds to write light 14 in FIG. 3), the axis of ordinate indicates the intensity of the readout light (i.e. corresponds to readout light 26 of FIG. 3). It is confirmed from FIG. 4 that the infrared ray having weak intensity can be converted to visible ray. Moreover at this time, a high-limiting resolution of 50 line pair/mm can be obtained. These results show that semiconductor laser comprised of a wave length of 780 nm or a light emitting diode which emits a light comprised of long wavelength having high luminous intensity, can be used as a write light source. In order to increase the transmittance of the readout light (the maximum intensity of display light 26 the intensity of readout light 13) of the spatial light modulator, and to display using a light comprising the desired wave length, it is better to separate the readout light 13 and the write light 14, shown in FIG. 5. The readout light 13 and the write light 14 can be separated by sequentially depositing multilayer comprised of dielectric materials (for example, SiO$_2$ and TiO$_2$) 17 and which reflect the readout light 13, and a light absorbing layer 18 which absorbs the readout light leaked from the multilayer 17, between the monolayer-type photoconductive layer 15 and the liquid crystal/resin composite layer 8. In this case, the write light 14 and the readout light 13 are respectively incidented from the side of the multilayer-type photoconductive layer 5 and the liquid crystal/ resin composite layer 8, and the intensity of the reflected light 26 (display light) of the readout light 13 is modulated, depending on the intensity of the write light 14.

When the wavelength comprising the readout light 13 is not influenced by the charge carrier generation layer 3, the spatial light modulator does not require the light absorbing layer 18. In this case, the reflectance of the surface of the multilayer comprised of dielectric material 17, which is diminished, is caused by the processing of the pigment included in the monolayer-type photoconductive layer 15. In order to solve this problem, it is preferable to position an under layer comprised of polymethylacrylate resin, or polycarbonate resin between the monolayer-type photoconductive layer 15 and the multilayer 17 of dielectric material.

Moreover, as a substitute for the multilayer 17 comprised of dielectric material, a metallic film of aluminum, or chromium, which is finely divided with an interval of 1 to 500 μm, and is electrically insulated, can be used.

What is claimed is:

1. An optically addressed spatial light modulator comprising a photoconductive layer, a liquid crystal layer, and transparent electrodes characterized in that:

the photoconductive layer is a multilayer-type photoconductive layer comprising a charger carrier generation layer which is made of one kind or more than two kinds of photoconductive material, and a charge carrier transport layer which is made of a carrier material having a large mobility;

the liquid crystal layer is a liquid crystal/resin composite layer comprising a nematic liquid crystal, cholesteric liquid crystal, smetic liquid crystal, or a blended liquid crystal, and a transparent resin having an equivalent refractive index to ordinary refractive index of the liquid crystal, where either the resin is dispersed into the liquid crystal, or the liquid crystal is dispersed into the resin;

said charge carrier transport layer is located on the charge carrier generation layer on the side where the liquid crystal/resin composite layer is located; and the transparent electrodes are fixed to the two diametrically opposite side of these layers.

2. An optically addressed spatial light modulator according to claim 1, characterized in that a resin film of which photoconductive material is dispersed or a single layer comprised of said photoconductive layer is used as said charge carrier generation layer.

3. An optically addressed spatial light modulator according to claim 1, characterized in that the photoconductive material is selected from the group consisting of a phthalocyanine pigments, azo pigments, polycyclic quinone pigments, perylene pigments, perynone pigments, anthraquinone pigments, indigo pigments, thioindigo pigments, dioxadine pigments, azolake pigments, thiapyrylium dyes, quinacridone pigments, cyanin dyes, merocyanine dyes, pyrrol pigments, porphyrin pigments, anthanthrone pigments, squarilium dyes, and azulenium dyes.

4. An optically addressed spatial light modulator according to claim 3, characterized in that the photoconductive material is selected from at least one kind of the group consisting of X-type metal-free phthalocyanine,τ-type metal-free phthalocyanine, 1,4-dithioketo-3,6-diphenylpyrrolo[3,4-C]pyrrole, titanium phthalocyanine, copper phthalocyanine, chloroaluminum phthalocyanine, zinc phthalocyanine, vanadium phthalocyanine, and dibromo anthanthrone.

5. An optically addressed spatial light modulator according to claim 1, characterized in that the photoconductive material is selected from the group consisting of ZnO, TiO, CdS, CdSe, Se, amorphous Se, Si, amorphous Si, SeTe, amorphous SeAs, SeAs, amorphous SeTe, GaAs, and GaP.

6. An optically addressed spatial light modulator according to claim 1, characterized in that the charge carrier transport material of the charge carrier transport layer is selected from the group consisting of hydrazone, stilbene, polyvinylcarbazole, pyrazoline, oxazole, oxadiazole, triphenylmethane, amine derivatives, N-phenylcarbazole, butadiene derivatives, fluorenone derivatives, and diphenoquinone derivatives.

7. An optically addressed spatial light modulator comprising a photoconductive layer, a liquid crystal layer, and transparent electrodes characterized in that:

the photoconductive layer is a multilayer-type photoconductive layer comprising a charge carrier generation layer which is made of one kind or more than two kinds of photoconductive material, and a charge carrier transport layer which is made of a carrier material having a large mobility which contact said liquid crystal layer;

the liquid crystal layer is a liquid crystal/resin composite layer comprising a nematic liquid crystal, cholesteric liquid crystal, smectic liquid crystal, or a blended liquid crystal, and a transparent resin having an equivalent refractive index to ordinary refractive index of the liquid crystal, where either the resin is dispersed into the liquid crystal, or the liquid crystal is dispersed into the resin; and the multilayer-type photoconductive layer and the liquid crystal/resin composite layer are fixed to each other and the transparent electrodes are fixed to the two diametrically opposite side of these layers, wherein the photoconductive material is selected from at least one kind of the group consisting of X-type metal-free phthalocyanine, τ-type metal-free phthalocyanine, 1,4-dithio,eto-3,6-diphenylpyrrolo[3,4-C]pyrrole, titanium phthalocyanine, copper phthalocyanine, chloroaluminum phthalocyanine, zinc phthalocyanine, vanadium phthalocyanine, and dibromo anthanthrone.

8. An optically addressed spatial light modulator comprising an organic photoconductive layer, a liquid crystal layer, and transparent electrodes characterized in that:

the organic photoconductive layer is a monolayer-type photoconductive layer comprising one kind or more than two kinds of a photoconductive material and a binder resin, the photoconductive material is dispersed in the binder resin;

the liquid crystal layer is a liquid crystal/resin composite layer comprising a nematic liquid crystal, cholesteric liquid crystal, smectic liquid crystal, or a blended liquid crystal of these liquid crystals, and a transparent resin having an equivalent refractive index to ordinary refractive index of the liquid crystal, where either the resin is dispersed in the liquid crystal, or the liquid crystal is dispersed in the resin; and the monolayer-type photoconductive layer and the liquid crystal/resin composite layer are fixed to each other and then the transparent electrodes are fixed to the two diametrically opposite sides of these layers, wherein the photoconductive material is selected from at least one kind of the group consisting of X-type metal-free phthalocyanine, τ-type metal-free phthalocyanine, 1,4-dithio,eto-3,6-diphenylpyrrolo[3,4-C]pyrrole, titanium phthalocyanine, copper phthalocyanine, chloroaluminum phthalocyanine, zinc phthalocyanine, vanadium phthalocyanine, and dibromo anthanthrone.

9. An optically addressed spatial light modulator according to claim 8, characterized in that between said monolayer-type photoconductive layer and said liquid crystal/resin composite layer, a light reflector comprised of a divided metallic film or a multilayer of dielectric material is positioned therein.

10. An optically addressed spatial light modulator according to claim 9, characterized in that between said monolayer-type photoconductive layer and said light reflector, a light absorbing layer which absorbs light is positioned therein.

11. An optically addressed spatial light modulator comprising a photoconductive layer, a liquid crystal layer, and transparent electrodes characterized in that:

the photoconductive layer is a multilayer-type photoconductive layer comprising a charge carrier generation layer which is made of one kind or more than two kinds of photoconductive material, and a charge carrier transport layer which is made of a carrier material having a large mobility which contact said liquid crystal layer;

the liquid crystal layer is a liquid crystal/resin composite layer comprising a nematic liquid crystal, cholesteric liquid crystal, smectic liquid crystal, or a blended liquid crystal, and a transparent resin having an equivalent refractive index to ordinary refractive index of the liquid crystal, where either the resin is dispersed into the liquid crystal, or the liquid crystal is dispersed into the resin; and the multilayer-type photoconductive layer and the liquid crystal/resin composite layer are fixed to each other and the transparent electrodes are fixed to the two diametrically opposite sides of these layers wherein the liquid crystal is formed of liquid crystal droplets in the range of 0.5 to 10 microns.

\* \* \* \* \*